United States Patent
Capp et al.

(10) Patent No.: US 7,834,479 B2
(45) Date of Patent: Nov. 16, 2010

(54) METHODS AND SYSTEMS FOR INTENTIONALLY ISOLATING DISTRIBUTED POWER GENERATION SOURCES

(75) Inventors: F. William Capp, Boston, MA (US); Matthew L. Lazarewicz, Boxford, MA (US); Hernan Alex Rojas, Mansfield, TX (US)

(73) Assignee: Beacon Power Corporation, Tyngsboro, MA (US)

( * ) Notice: Subject to any disclaimer, the term of this patent is extended or adjusted under 35 U.S.C. 154(b) by 359 days.

(21) Appl. No.: 11/817,580

(22) PCT Filed: Mar. 1, 2006

(86) PCT No.: PCT/US2006/007428

§ 371 (c)(1),
(2), (4) Date: Apr. 7, 2008

(87) PCT Pub. No.: WO2006/094128

PCT Pub. Date: Sep. 8, 2006

(65) Prior Publication Data

US 2008/0278000 A1     Nov. 13, 2008

Related U.S. Application Data

(60) Provisional application No. 60/657,842, filed on Mar. 1, 2005.

(51) Int. Cl.
*H02J 3/01* (2006.01)
(52) U.S. Cl. ....................................................... 307/21
(58) Field of Classification Search .................. 307/21; 700/286; 363/74
See application file for complete search history.

(56) References Cited

U.S. PATENT DOCUMENTS

| 5,754,033 | A | 5/1998 | Thomson |
| 6,219,623 | B1 | 4/2001 | Wills |
| 6,240,337 | B1 | 5/2001 | Marr, Jr. et al. |
| 6,750,391 | B2 * | 6/2004 | Bower et al. ................. 136/244 |
| 6,810,339 | B2 | 10/2004 | Wills |

(Continued)

OTHER PUBLICATIONS

Lasseter et al., "Integration of Distributed Energy Resources—The CERTS MicroGrid Concept," White Paper Consortium for Electric Reliability Technology Solutions, Apr. 1, 2002.

(Continued)

*Primary Examiner*—Albert W Paladini
(74) *Attorney, Agent, or Firm*—David G. Conlin; Steven M. Jensen; Edwards Angell Palmer & Dodge LLP (57) ABSTRACT

A method and system for operating a mini-grid including one or more power generation sources and one or more loads independently from a utility grid is provided, where the mini-grid is disconnected from the utility grid in response to a power disruption over the utility grid. A universal interconnect device forms a connection between the mini-grid and the utility grid. In the disconnected state, the mini-grid operates independently from the utility grid, such that the power generation sources of the mini-grid supply the loads. Frequency and voltage regulation are provided by the universal interconnect device through a monitoring function performed by a controller in conjunction with at least an energy storage device, which can absorb or generate power as needed.

22 Claims, 5 Drawing Sheets

U.S. PATENT DOCUMENTS

| | | | |
|---|---|---|---|
| 6,819,087 B2 * | 11/2004 | Delmerico et al. | 322/58 |
| 6,882,904 B1 | 4/2005 | Petrie et al. | |
| 7,127,327 B1 * | 10/2006 | O'Donnell et al. | 700/286 |
| 7,378,820 B2 * | 5/2008 | Liu et al. | 322/44 |
| 2004/0051387 A1 | 3/2004 | Lasseter et al. | |
| 2005/0077881 A1 | 4/2005 | Capp et al. | |
| 2005/0154499 A1 | 7/2005 | Aldridge et al. | |

OTHER PUBLICATIONS

Lasseter, R. H., "MicroGrids," 2002 IEEE Power Engineering Society. Winter Meeting. Conference Proceedings, New York, Jan. 27-31, 2002.

* cited by examiner

METHODS AND SYSTEMS FOR INTENTIONALLY ISOLATING DISTRIBUTED POWER GENERATION SOURCES

CROSS-REFERENCE TO RELATED APPLICATION

This application claims the benefit of U.S. Provisional Application Ser. No. 60/657,842 filed on Mar. 1, 2005, the teachings of which are incorporated herein by reference.

FIELD OF INVENTION

The subject invention relates to methods and systems for intentionally isolating one or more distributed power generation sources connected to a mini-grid, and more particularly relates to methods and systems for disconnecting a mini-grid including one or more distributed generation (DG) sources from a utility grid and operating the mini-grid independently.

BACKGROUND OF THE INVENTION

Distributed generation (DG) is the use of power generation technologies located close to one or more loads being served. Distributed energy resources (DER) is another term describing the use of one or more DG sources and/or other components that are interconnected with the utility grid. Such interconnection involves assembling the various components in such a manner that they satisfy the requirements of the utility service provider that operates the utility grid in the jurisdiction. These requirements include electrical equipment safety standards and regulations promulgated by the Institute of Electrical and Electronic Engineers (IEEE) and the Underwriters Laboratory (UL). For example, interconnection requirements for DER systems are provided in the "Point of Common Coupling" (PCC) standard of IEEE 1547. As another example, the UL requires each DG source that interconnects with the utility grid to individually satisfy the requirements of UL 1741.

Distributed power generation is becoming more common throughout the world as alternative energy sources are being used to generate electric power. In the United States, deregulation of electric utilities has influenced the development of independent energy sources, which are tied into the utility grid. Typical DG sources include turbine generators, internal combustion engines/generators, micro-turbines, gas turbines, photovoltaics/solar panels, wind turbines, fuel cells, batteries, capacitor-type storage systems, and flywheel energy storage systems. DG stakeholders include energy companies, equipment suppliers, regulators, energy users and financial and supporting companies.

Examples of distributed power generation include a hospital operating a reciprocating engine for standby power or to enable peak shaving, a computer chip manufacturer operating a fuel cell and using DG sources to ensure suitable power quality, a chemical plant operating a combustion turbine, and residential sources such as photovoltaics, batteries, and fuel cells. Common DG applications include load reduction, standby power, peak shaving, net metering, residential solar, combined with heat (CHP), grid support, premium power, island systems, and remote agricultural. Common configurations include grid connected, grid independent, hybrid systems, and mini-grid.

DG systems can provide a number of benefits, depending upon the particular system, including but not limited to: greater reliability, customized solutions, premium power capability, savings when combined with heat (CHP), reduced demand charges, power in remote and islanded conditions, environmental benefit if renewable resources are used, and energy independence.

However, current DG systems have various limitations, for example, small grids generally do not have much load or generation averaging, and need more voltage and frequency stabilization, on the order of 10-20%, as compared to most utility grids which require 1-2% adjustment for voltage and frequency stabilization. Also, DG sources tend not to follow loads well. Fuel cells, wind, micro-turbines, and natural gas sources are reciprocating, but require significant VARs and/or responsive energy storage. Other technical limitations include the lack of a single standard for communicating with DG systems, the need for back-up, black start, and overloads, and conflicts between anti-islanding schemes.

Interconnection issues affect both DG users and utilities. The DG user would like to receive voltage support, frequency regulation, and back-up from the utility grid, but often is subjected to substantial charges just to receive "free" VARs. Moreover, control standards for hybrid systems can be difficult for the DG user to follow. On the other hand, utilities receive a high demand for VARs, which are generated at the expense of real power sales. Utilities also are concerned about islanding and safety issues, the variability of net power, communication, setting rates, and not receiving congestion relief if back-up is required. Although DG users require a connection to the grid, utility operators see DG as a burden.

Commercial utility customers and large residential customers that support significant loads usually maintain a primary connection to the utility grid, but sometimes utilize back-up power generation sources to service their loads in the event of a power disruption. Such customers can be connected to the utility grid in one of two basic arrangements: a traditional one-way arrangement and a two-way arrangement. In the traditional one-way arrangement, the utility customer operates back-up power generation sources such as batteries or diesel generators only in the event of a power disruption that interferes with the supply of power from the utility grid. Otherwise, the back-up sources generally are not used.

In a two-way arrangement, the power generation sources are arranged to provide distributed generation (DG) and operate on a periodic or substantially continuous basis. In two-way arrangements, one or more loads and the DG sources are connected to form a mini-grid having a connection to the utility grid. A mini-grid typically refers to one or more independent energy sources (e.g., DG sources), one or more loads, and other components such as electrical connection circuitry that are linked together, where the mini-grid usually maintains a primary connection to the utility grid.

With two-way arrangements, the utility customer remains connected to the utility grid, and becomes a net purchaser of power during peak load operating conditions; for example, a factory would buy power during hours of peak demand. The utility customer then sells back unused power generated by the DG sources during off-peak hours or at times when load demands are minimal.

Conventionally, to satisfy peak-hour load demands, it is necessary and desirable for operators of mini-grids that include DG sources to maintain a connection to the utility grid. Without such a continuous connection, the mini-grid can suffer from power quality and reliability problems. These problems revolve around two major system parameters: frequency stability and voltage regulation.

Frequency and voltage are related to the two types of power supplied by the utility service provider to the utility grid: real power and reactive power. Real power is the power that performs real work, and is equal to the time average of the instantaneous product of voltage and current. Reactive power is the power that exists in the electrical distribution and transmission system due to the inherent capacitive and inductive elements in the system. Reactive power, also known as imaginary power, is also sometimes referred to as "VAR" or "VARs". Reactive power is the instantaneous product of voltage and current, where the current is phase shifted plus or minus 90 degrees.

Both real power and reactive power are generated and supplied to utility customers over the utility grid. Real power generation is associated with frequency stability. In the United States, electric current is generated so as to provide an alternating current (AC) at a desired frequency of 60 Hz. In order to keep the AC frequency within desired limits and/or ranges, the difference between the load and the power being generated is determined periodically, and this difference is used to increase or decrease the output of generators/power generation facilities. Typically, about one percent (1%) of the power being transmitted and/or capable of being generated and delivered to the utility grid is reserved to fine tune or regulate the AC frequency of the electrical power being distributed. A system for regulating the frequency of generated power using flywheel energy storage systems is described in U.S. Ser. No. 10/920,146, filed on Aug. 16, 2004, which is incorporated by reference herein. Utility customers rely on a continuous connection with the utility grid to provide frequency stability, which prevents damage to electrical equipment and loads.

Although utility customers are directly billed (e.g., in kilowatt-hours) for the real power consumed by their loads linked to the utility grid, access to reactive power (or VARs) is equally important. Reactive power supplied through the utility grid is critical for providing voltage regulation or load matching capabilities. In conventional mini-grid arrangements, there is a hazard to load equipment which can be damaged by unstable grid voltage or frequency whenever the mini-grid is disconnected from the utility grid. Continuous monitoring and control of the mini-grid must be provided by remote and local operators, since DER systems are sensitive to electric power disturbances from the utility grid, and vice versa.

When a mini-grid is disconnected from the utility grid, DG sources of the mini-grid become tied directly to one or more loads. In cases where there is a disabled connection between the mini-grid and the utility grid, a condition known as "islanding" occurs. Islanding is defined for purposes of this application as the continued operation of a DER system or mini-grid when the utility grid has been switched off or otherwise disconnected from the mini-grid so that no electric energy flows from the utility grid to the mini-grid.

Conventionally, in an island condition, the DG sources of the mini-grid are directly linked to the one or more loads, and no real power or reactive power is delivered by the utility grid. In some cases, the mini-grid remains connected to the utility grid so that electric power is supplied from the mini-grid to the utility grid, which can result in quality problems for the utility service provider because the power supplied to the utility grid may not satisfy voltage and frequency requirements. An anti-islanding power converter has been developed to protect against the problems associated with islanding conditions. As described in U.S. Pat. Nos. 6,219,623 and 6,810,339, such converters are used to isolate DG sources from the utility grid when voltage or frequency measurements are outside acceptable ranges.

When the mini-grid operates in an islanding condition, such that no electric energy flows from the utility grid to the mini-grid, the DG sources of the mini-grid may not supply sufficient real power or reactive power to satisfy the requirements of the load-bearing equipment. Even if the real power generated temporarily matches the loads, there may be problems associated with frequency regulation and voltage regulation, as discussed above. Moreover, the selection or combination of DG sources linked to the mini-grid may result in load-following or power quality problems. For example, fuel cells may trip offline due to large transient cyclic loads, while synchronous generators tend to simply shut down when the mini-grid is isolated or disconnected from the utility grid.

DER systems capable of being monitored and controlled remotely are desirable for utility and area operators. Unfortunately, the lack of standardization in communication protocols and physical connections for DER systems often makes it impractical for utilities and area operators to gain access to these mini-grids/DER systems. In most instances, utilities only require aggregated data such as total production, total available capacity, and operational state from the DER systems. The situations is further complicated by sites with multiple DER systems and mini-grids requiring separate communication channels.

It thus would be desirable to provide a universal device, system, and method for connecting mini-grids operating under various communication protocols with the utility grid.

It also would be desirable to provide systems and methods for allowing continued operation of DG sources in a mini-grid to supply the one or more loads connected to the mini-grid upon disconnection from the utility grid. In other words, it would be desirable to intentionally isolate mini-grids of DER systems/DG sources in the event of disruption or disconnection from the utility grid. Presently available devices and techniques do not provide substantial frequency stability and load-following capabilities to permit substantially continuous operation of a mini-grid when disconnected from the utility grid.

SUMMARY OF THE INVENTION

Methods and systems are provided for operating mini-grids in at least two operating states, where an exemplary mini-grid includes one or more distributed generation (DG) sources and one or more loads. In a first state, the mini-grid is connected to a utility grid. If the power supply becomes disrupted over the utility grid, the mini-grid can be disconnected from the utility grid such that the mini-grid is operable in a second state of intentional isolation from the utility grid. The methods and systems of the subject invention utilize a universal interconnect device for providing the connection between the mini-grid and the utility grid, thereby standardizing connections of mini-grids that operate under different communication protocols and enabling local and remote monitoring of the mini-grids.

The mini-grid preferably includes one or more DG sources and one or more loads that are connected together by a bus that preferably is a three-phase AC bus operating at 60 Hz, or the same frequency as the utility grid. The DG sources can include turbine generators, internal combustion engines/generators, micro-turbines, gas turbines, photovoltaics/solar panels, wind turbines, fuel cells, batteries, capacitor-type storage systems, and flywheel energy storage systems.

According to the subject invention, the universal interconnect device preferably includes at least a communication/control module, an energy storage device, and a power quality compensator or inverter. The communication/control module is configured to receive signals from an ISO or grid operator, or alternatively includes sensors to monitor the condition of the utility grid. In the event of a disruption of power supply or quality problems on the utility grid, the mini-grid can be disconnected from the utility grid and operated independently from the utility grid, i.e., a state of intentional isolation of the mini-grid.

When operated independently from the utility grid, loads connected to the mini-grid are serviced directly by the DG sources connected to the mini-grid. A voltage of the mini-grid is continuously or periodically monitored by a communication/control module. If the voltage is increasing, the universal interconnect device, which preferably includes at least a power quality compensator, absorbs reactive power from the bus. Alternatively, if the voltage is decreasing, the universal interconnect device delivers reactive power to the bus. Otherwise, the communication/control module continues to monitor the voltage of the mini-grid.

At the same time, while the mini-grid is operated independently from the utility grid, the communication/control module continuously or periodically monitors a frequency of the mini-grid. If the frequency is increasing, the universal interconnect device, which preferably includes at least an energy storage device, absorbs real power from the bus. The energy storage device can include one or more flywheels, or one or more other power generation devices capable of handling large cyclic loads and exhibiting a reaction time of under 20 milliseconds, more preferably about 7 to 15 milliseconds, depending on the particular application. As the energy storage device approaches full, the communication/control module can either bring a DG source offline, or add another load to the mini-grid. Alternatively, if the frequency of the mini-grid is decreasing, the universal interconnect device delivers real power to the bus. If the energy storage device is approaching empty, the communication/control module can either disconnect a lower priority load, or bring another DG source online.

A method for operating a mini-grid including one or more power generation sources and one or more loads connected to a bus, preferably includes the steps of: monitoring a condition of a utility grid, disconnecting the mini-grid from the utility grid to operate the mini-grid independently in response to a power disruption over the utility grid, monitoring at least one of a frequency and a voltage of power on the bus, and operating the universal interconnect device to control the frequency or the voltage of the power on the bus. Preferably the universal interconnect devices includes at least one of an energy storage device and a power quality compensator As provided herein, when the mini-grid is operated independently from the utility grid, the universal interconnect device is capable of monitoring the frequency and voltage of the mini-grid, and balancing the one or more DG sources with the one or more loads to provide appropriate frequency and voltage control.

Other aspects and embodiments of the invention are discussed below.

BRIEF DESCRIPTION OF THE DRAWING

For a fuller understanding of the nature and desired objects of the subject invention, reference is made to the following detailed description taken in conjunction with the accompanying drawing figures wherein like reference character denote corresponding parts throughout the several views and wherein.

DESCRIPTION OF THE PREFERRED EMBODIMENT(S)

Figure 1:
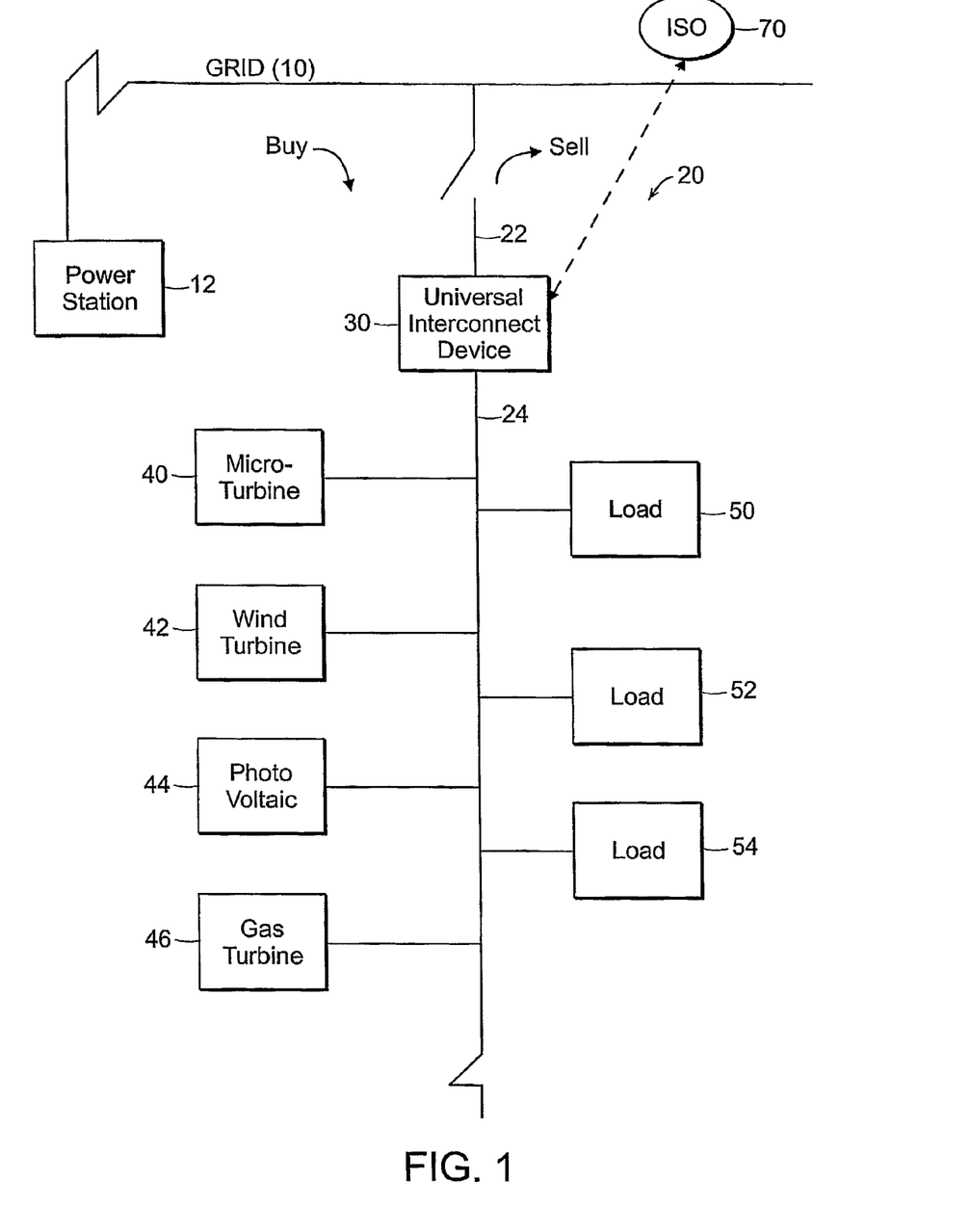
FIG. 1 is a block diagram of an exemplary DER system connected to a utility grid.

Referring now to the various figures of the drawing wherein like reference characters refer to like parts, there is shown in FIG. 1 a block diagram of an exemplary system for connecting one or more distributed generation (DG) sources and one or more loads to form a mini-grid. The mini-grid preferably is configured and arranged to be connected to a utility grid, where the mini-grid can be a distributed energy resources (DER) system made up of one or more DG sources and one or more loads. Suitable DG sources include but are not limited to: turbine generators, internal combustion engines/generators, micro-turbines, gas turbines, photovoltaics/solar panels, wind turbines, fuel cells, batteries, capacitor-type storage systems, and flywheel energy storage systems. Any number or combination of these sources can be provided, depending upon the application or the particular mini-grid.

As shown in FIG. 1, the utility grid 10 can be operated by a utility service provider or area operator. Power is generated and supplied to the utility grid by one or more power stations 12, where only one power station 12 is depicted in FIG. 1 for simplicity. A mini-grid 20 can be connected to the utility grid 10 by a disconnect switch 22. During normal operation of the utility grid, the switch 22 is closed, and the mini-grid 20 remains connected to the utility grid 10 so that power received from the utility grid 10 can be used to supply the loads connected to the mini-grid 20. Power to be drawn from the utility grid 10 can be purchased by the utility customer for use on the mini-grid 20. When excess power is produced beyond what is consumed by the loads of the mini-grid, the excess power can be distributed and sold back to the utility service provider via the utility grid 10.

FIG. 1 is a simplified diagram of connections between the utility grid 10 and various DG sources and loads of the mini-grid 20. The mini-grid 20 includes a bus 24 for receiving electric power from the utility grid 10, receiving power generated by one or more DG sources, and distributing power to one or more loads. For example, as provided in FIG. 1, the one or more DG sources can include a micro-turbine 40, a wind turbine 42, a photovoltaic cell 44, and a gas turbine 46. Alternatively, the DG sources can include any number or combination of these sources, or any other suitable DG sources. In FIG. 1, a plurality of loads 50, 52, and 54 are connected to the bus 24, but the mini-grid can include one or more loads depending upon the particular mini-grid. As used herein, loads refer to any equipment that consumes electrical energy, and include dynamic resistive and reactive loads.

Generation and distribution of power over the bus 24 is controlled by a universal interconnect device 30. The universal interconnect device 30 is described in greater detail below, and its various components and connections are depicted in FIG. 2.

Figure 2:
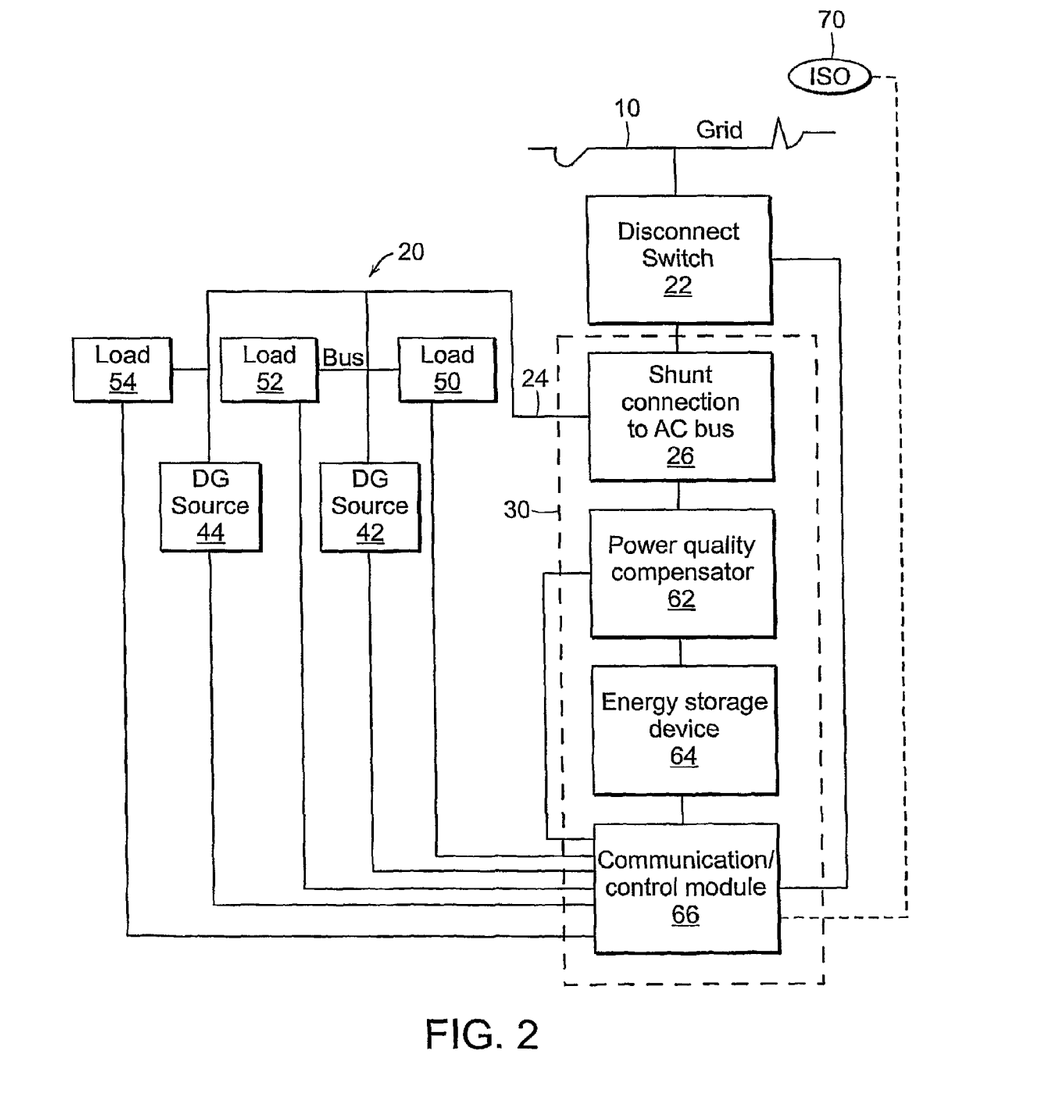
FIG. 2 is a block diagram of a mini-grid including the DER system of FIG. 1 and a universal interconnect device.

As shown in FIG. 2, when the disconnect switch 22 is closed, the mini-grid 20 is connected to the utility grid 10 so that power can be received from the utility grid, and excess power can be sold back to the utility grid. The mini-grid 20 includes one or more loads (such as the loads 50, 52, and 54) and one or more DG sources (e.g., the DG sources 42 and 44)

which are connected to the bus 24. The bus 24 preferably is a three-phase 60 Hz AC common bus used for connecting the one or more loads and the one or more DG sources found on the mini-grid. In other words, the bus 24 preferably operates with alternating current (AC) at about the same frequency, 60 Hz, as the utility grid 10. Alternatively, the bus 24 can use direct current (DC) instead of alternating current (AC). The universal interconnect device 30 is connected to the bus 24 by a shunt connection 26 or another suitable coupling arrangement, such as double conversion. Such coupling arrangements are conventional, and are not described in further detail herein.

The universal interconnect device 30 preferably includes one or more components for monitoring the condition of the utility grid 10 and/or receiving one or more signals representing the condition of the grid 10, such that the universal interconnect device 30 controls operation of the mini-grid 20 and determines whether to disconnect the mini-grid 20 from the utility grid 10 in the event of a disruption in the supply or quality of electric power delivered over the utility grid, or in the event of a problem experienced in the mini-grid 20 itself. In addition to the shunt connection 26, the universal interconnect device 30 preferably includes one or more of the following components: a power quality compensator 62, an energy storage device 64, and a communication/control module 66.

The universal interconnect device 30 includes at least one communication/control module (or "controller") 66 that is preferably linked to the DG sources (such as DG sources 42 and 44) connected to the mini-grid 20. The communication/control module 66 is provided to control operation of the mini-grid 20 when the switch 22 is closed or open, in other words, when the mini-grid 20 is connected to the utility grid 24 or the mini-grid 20 is disconnected from the utility grid 10, respectively. In the latter arrangement, the switch 22 is in an open condition, and the mini-grid 20 is isolated from the utility grid 10.

The mini-grid 20 would be operated independently of the utility grid 10 in the event of a disruption in the supply or quality of power distributed over the utility grid 10. For example, whenever voltage or frequency fall outside acceptable ranges, load-bearing equipment of the mini-grid 20 can be damaged. Damage to power lines is another situation where disconnection from the utility grid is a possibility. To determine whether the utility grid 10 is operating normally, such that the voltage and frequency characteristics of the electric power are within acceptable ranges, the communication/control module 66 can receive a signal from ISO 70 or the utility service provider or authority that operates the utility grid 20. Such a signal can be a radio signal received via wireless communications equipment in the communication/control module 66, or through a wired connection. Alternatively, the communication/control module 66 can include one or more sensors (not shown) for continuously or periodically monitoring conditions on the utility grid 10.

The universal interconnect device 30 can provide frequency stability and voltage regulation for the mini-grid 20. In particular, voltage regulation is provided by the universal interconnect device, in particular through the connection between the communication/control module 66 and the power quality compensator 62, which is capable of generating or absorbing reactive power from the mini-grid. Therefore, the universal interconnect device can provide suitable voltage regulation in the event the mini-grid becomes disconnected from the utility grid, that is, when the mini-grid 20 operates independently from the utility grid 10.

Frequency of the mini-grid is controlled by the universal interconnect device, which preferably includes at least the energy storage device 64 and the communication/control module 66. The energy storage device 64 encompasses one or more energy storage devices, which are collectively referred to herein as the energy storage device 64. The universal interconnect device can either absorb real power or generate real power as needed, and based on predetermined criteria maintained in the communication/control module 66. By providing a universal interconnect device which includes the energy storage device 64, frequency stability can be maintained in the event the mini-grid 20 becomes disconnected from the utility grid 10, in other words, when the mini-grid is operated in an intentionally isolated state.

The energy storage device 64 should be capable of generating the needed power within a relatively short reaction time, such as under 20 milliseconds, more preferably within approximately 7 to 15 milliseconds, or within a shorter time frame as required in a particular mini-grid. Because of this relatively short reaction time, certain power generation sources are more suitable for use as part of the energy storage device 64. One particularly suitable source is a flywheel energy storage system (FESS), or an array of FESS devices. Suitable FESS devices and FESS arrays/sub-systems are described in U.S. Ser. No. 10/920,146, filed on Aug. 16, 2004, which is incorporated by reference herein.

One suitable application of the energy storage device 64 is a FESS array of 10 (ten) 25-kWh flywheels, which are capable of generating 1 MW of power for 15 minutes. Such flywheels are highly mobile and can provide a quick connection, and have a fast response time. Moreover, flywheels are especially suited for use as the energy storage device 64 because of the fast response time, a 20-year useful life, and the ability to absorb or deliver real power for sustained periods, e.g., 15 minutes. Further, flywheels are economical, sustainable clean technology with deep discharge and high cyclic capabilities. Overall, flywheels provide excellent performance characteristics.

In general, the energy storage device 64 must be capable of cycling a large number of times to respond to instantaneous voltage and frequency fluctuations. One or more FESS devices can satisfy this requirement. Other suitable power generation sources include super-capacitors, and various electrochemical and electrostatic devices. One or more batteries or battery farms generally cannot be used as the energy storage device 64 because of inadequate cyclic capability. Fuel cells also generally are not ideal for such use, as they can trip offline under large transient loads. The energy storage device 64 in the form of a FESS array or other suitable power generator preferably generates DC voltage, which can be supplied to the power quality compensator 62 in the arrangement of FIG. 2.

The power quality compensator 62 can be a power converter such as a DC/AC inverter or similar component which is capable of converting electrical energy in the form of direct current (DC) generated by the energy storage device 64 into alternating current (AC) which can be distributed via the bus 20. In the event of disconnection of the mini-grid from the utility grid, the universal interconnect device 30, and in particular, the communication/control module 66 via the power quality compensator 62 generates or absorbs reactive power from the mini-grid. Although the power quality compensator 62 is not necessary for providing frequency regulation, it is preferable to include the power quality compensator for regulating voltage.

In the event of a disconnection of the mini-grid 20 from the utility grid 10, real power is generated or absorbed through the universal interconnect device 30. In particular, the energy storage device 64 generates or absorbs real power in response to commands received from the communication/control module 66. For example, if real power is required for frequency stability, the power is generated by the energy storage device 64, and is supplied to the power quality compensator 62, which converts the DC voltage to AC, and then the power is distributed to the AC bus 24 to provide the needed voltage or frequency adjustment to the bus voltage. Alternatively, if excess real power is generated by the one or more DG sources 42 and 44 connected to the mini-grid 20 when the mini-grid is disconnected from the utility grid, the excess power can be absorbed by the energy storage device 64 after conversion of AC voltage on the bus 24 to DC voltage for distribution to the energy storage device 64.

A method for operating the mini-grid 24 in an intentionally isolated condition from the utility grid 10 will now be discussed with reference to FIGS. 3-5. When the switch 22 is closed, and the mini-grid 20 is connected to the utility grid 10, the communication/control module 66 continuously or periodically monitors the utility grid 10, either by receiving signals from the ISO 70 or by sensing the condition of the utility grid 10 to determine if there is any disruption in power quality or distribution (step 110). In step 112, the communication/control module 66 evaluates whether the conditions on the utility grid 10 are so impaired as to require disconnection of the mini-grid 20 from the utility grid 10. Other techniques for monitoring the connection with a utility grid are described in U.S. Pat. Nos. 6,219,623 and 6,810,339, incorporated by reference herein.

The communication/control module 66 can include hardware and/or software to evaluate the power quality/distribution data sensed or received from the ISO 70 and determine whether disconnection is warranted based on predetermined criteria. For example, if the utility grid voltage or frequency falls outside acceptable ranges, disconnection may be required. If disconnection is not required, then the communication/control module 66 continues to monitor the utility grid 10. In the event that disconnection is deemed necessary, the communication/control module 66 sends a signal to the disconnect switch 22 (step 114), causing the switch 22 to open, and disconnecting the mini-grid 20 from the utility grid 10.

After the mini-grid 20 has been disconnected from the utility grid 10, the communication/control module 66 continuously or periodically monitors the frequency and voltage of the mini-grid 20 by taking readings at appropriate intervals from the bus 24. FIGS. 4 and 5 illustrate steps for monitoring and addressing fluctuations of voltage and frequency, respectively, of the mini-grid 20. According to the subject invention, voltage and frequency are continuously or periodically monitored when the mini-grid is operated in an intentionally isolated state, that is, disconnected from the utility grid. The steps depicted in FIGS. 4 and 5 occur substantially at the same time, as the communication/control module preferably monitors both voltage and frequency of the mini-grid.

Figure 4:
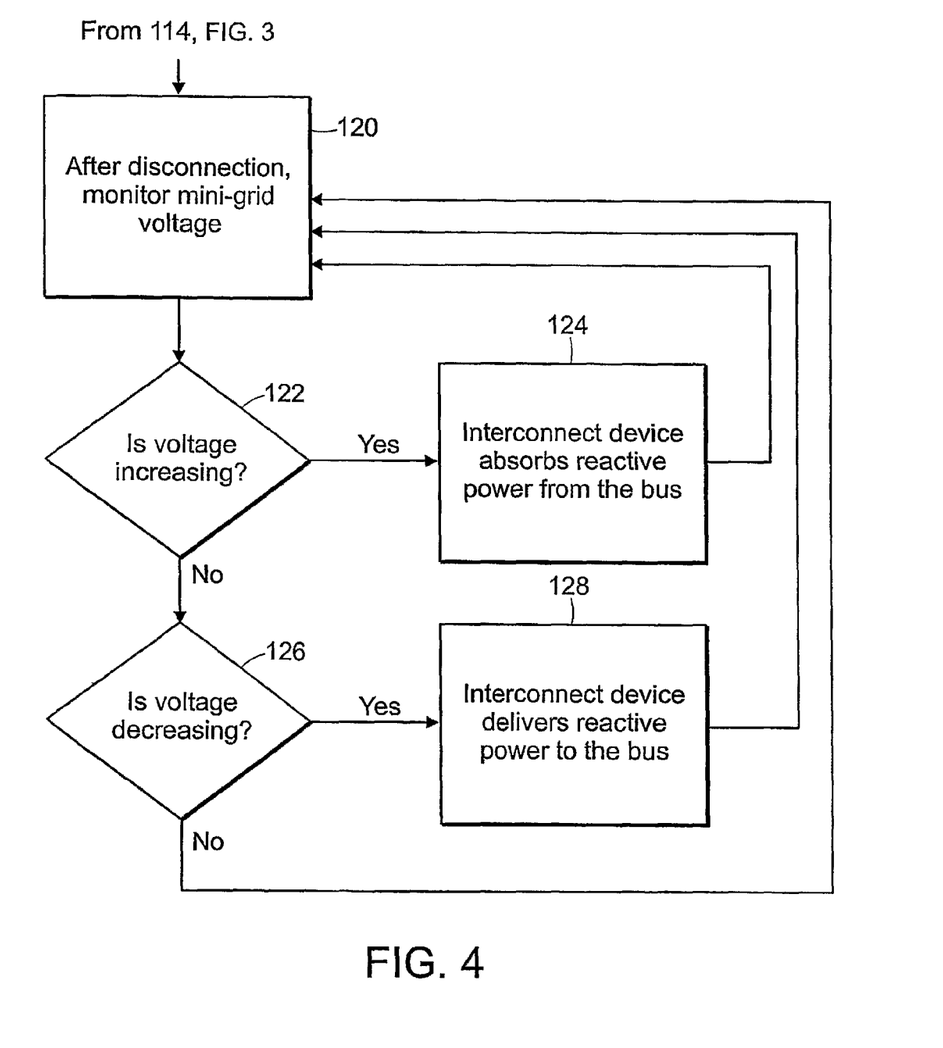
FIG. 4 is a flow diagram continued from FIG. 3 illustrating steps for monitoring the voltage of the mini-grid.

Referring to FIG. 4, after disconnection of the mini-grid from the utility grid, the communication/control module monitors a voltage of the mini-grid (step 120). Referring to FIG. 2, the communication/control module 66 preferably is operably connected to at least one of the loads 50, 52, and 54, and at least one of the DG sources 42 and 44. In certain embodiments of the subject invention, the communication/control module 66 can be connected to only one load, or only one DG source. In step 122, it is determined whether the voltage of the mini-grid is increasing, and if so, the universal interconnect device absorbs reactive power from the bus (step 124). On the other hand, if the voltage is decreasing on the bus (step 126), the universal interconnect device delivers reactive power to the bus (step 128). As shown in FIG. 2, the universal interconnect device includes a power quality compensator 62 operably connected to the energy storage device 64 and the communication/control module 66 for providing reactive power generation or absorption.

Figure 5:
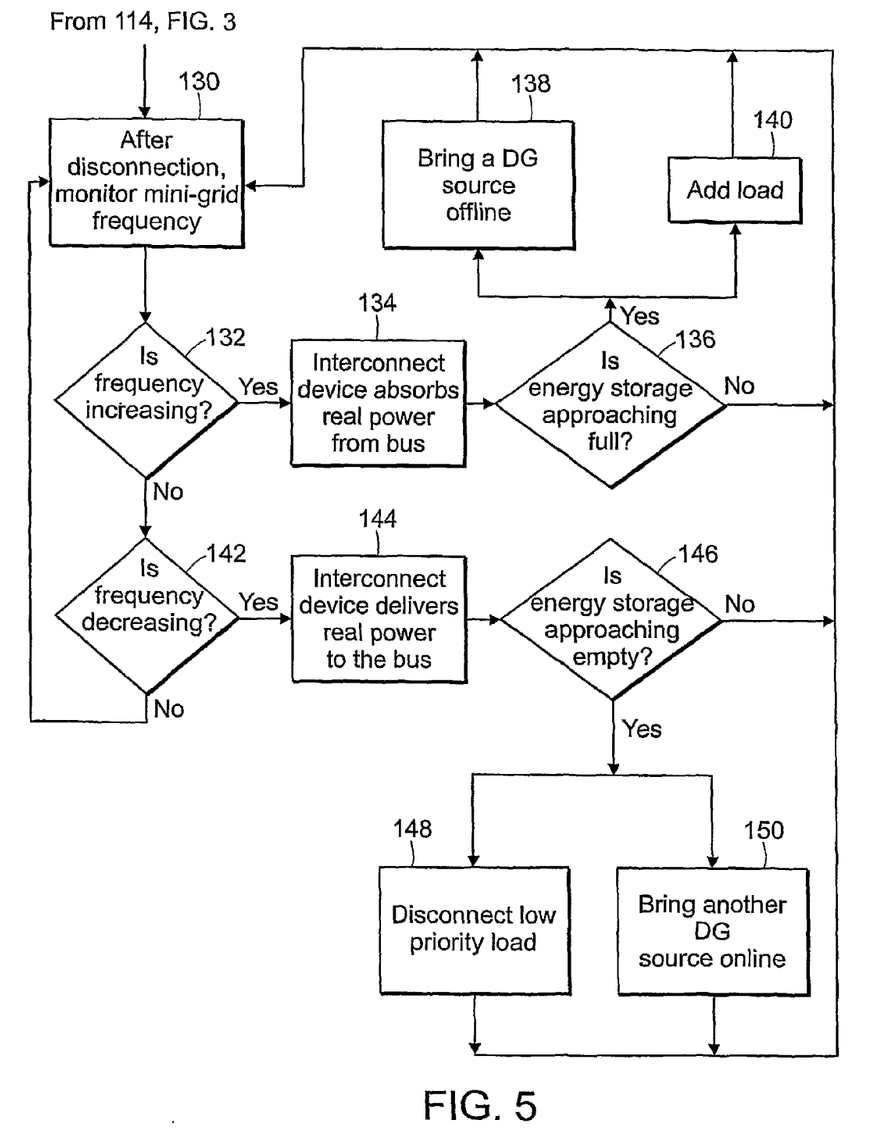
FIG. 5 is a flow diagram continued from FIG. 5 illustrating steps for monitoring the frequency of the mini-grid.

Referring to FIG. 5, after disconnection from the utility grid, the communication/control module monitors a frequency of the mini-grid (step 130). In step 132, if the frequency of the mini-grid is increasing, the universal interconnect device absorbs real power from the bus (step 134). If the energy storage device approaches a full state, that is, almost or at its full capacity (step 136), then at least one of the following two actions can be taken by the universal interconnect device. In step 138, the communication/control module 66 brings at least one DG source offline, thereby reducing power generation, and removing at least one source contributing to the excess real power on the bus. Alternatively or additionally, in step 140, the communication/control module 66 adds at least one load to the mini-grid, thereby consuming at least some of the excess real power present on the bus. Thereafter, the communication/control module continues to monitor the mini-grid frequency.

In step 142, if the frequency of the mini-grid is decreasing, the universal interconnect device delivers real power to the bus (step 144). If the energy storage device is approaching an empty state, or falls below a predetermined threshold (step 146), then at least one of the following two actions can be taken by the communication/control module. In step 148, the communication/control module 66 disconnects at least one load, preferably a low priority load, from the mini-grid, thereby reducing consumption of real power on the bus. Alternatively or additionally, to increase power generation, it is possible to bring online another DG source (step 150).

Referring to FIGS. 4 and 5, preferably the communication/control module 66 is operably linked to both one or more loads 50, 52, and 54, and one or more DG sources 42 and 44, in order to optimally control power consumption and power generation over the mini-grid 20.

Further, the monitoring steps (steps 120 and 130, respectively) can include monitoring the condition of the utility grid 10. If a signal is sent by the ISO 70, or the communication/control module 66 senses a normal condition of the utility grid 10, then the communication/control module 66 can cause the disconnect switch 22 to be closed, thereby reestablishing the connection between the mini-grid 20 and the utility grid 10. Once this connection is resumed, frequency and voltage regulation is performed primarily by the utility grid operator, and it is no longer necessary for the communication/control module 66 to provide voltage or frequency corrections, although the communication/control module 66 can continue to perform this function if desired.

Figure 3:
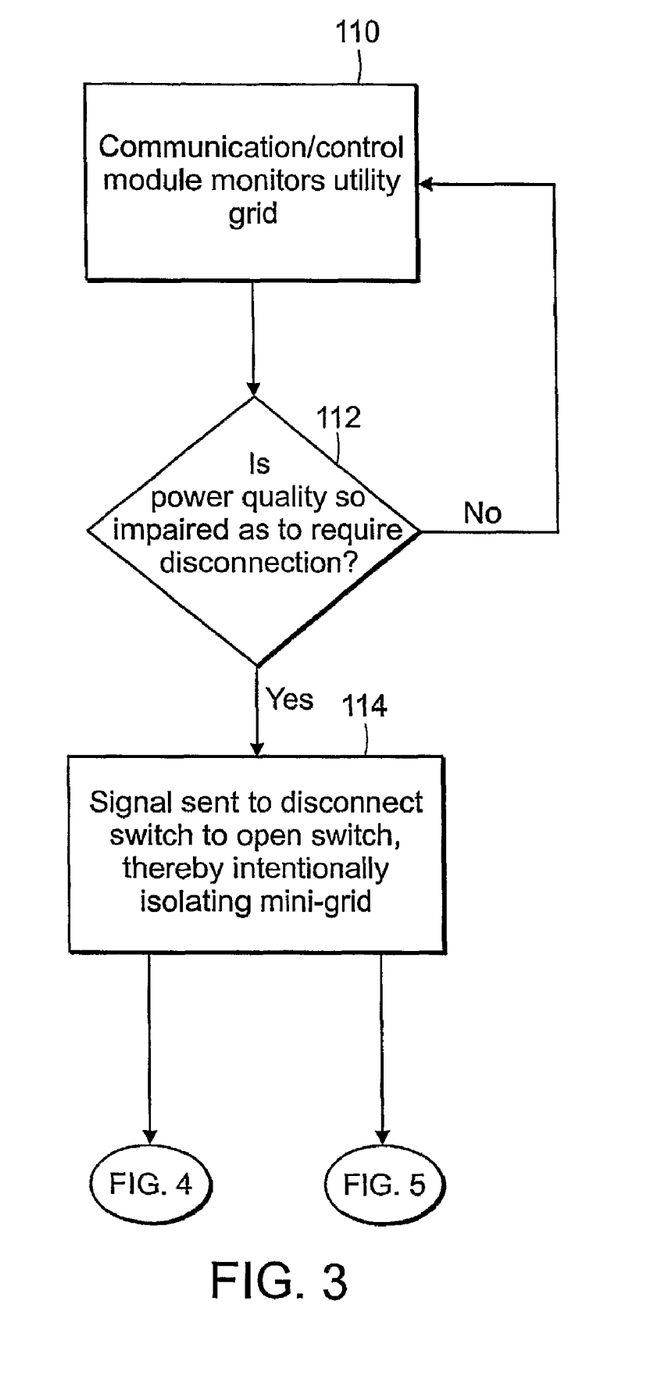
FIG. 3 is a flow diagram illustrating a method according to the subject invention for controlling the mini-grid as an intentional island.

According to the method of FIGS. 3-5, the one or more loads and the one or more DG sources connected to the mini-grid 20 are monitored in order to balance the loads against the DG sources, i.e., provide suitable load-matching. For example, the communication/control module 66 preferably takes readings at appropriate intervals of frequency and voltage levels on the bus 24, and thereby monitors whether power levels are either too low, too high, or within an acceptable range.

Preferably at least one of the loads connected to the mini-grid is considered of lower priority, or a non-critical load, and is capable of being disconnected from the mini-grid during times of load imbalance. For example, certain loads can be scheduled to operate during periods of peak load usage. Such loads can perform routine tasks, such as batch water heating in a factory environment, and thus are considered non-critical loads.

The universal interconnect device 30 of the subject invention is particularly useful for connecting a mini-grid system incorporating one or more loads and one or more DG sources to a utility grid. By using the universal interconnect device 30 of the subject invention, it is no longer necessary for each component of the mini-grid to be compliant with IEEE and UL requirements. For example, because the universal interconnect device 30 provides frequency and voltage regulation, the DG sources do not need to be UL 1741 compliant, because the DG sources are not directly connected with the utility grid 10. Instead, only the universal interconnect device 30 must satisfy IEEE and UL standards. As a result, operators of mini-grids can construct their own mini-grid systems without worrying about utility interconnect requirements, and it is not necessary for utility operators to check and monitor the mini-grids of utility customers. The universal interconnect device 30 can be connected to mini-grids following different communication protocols, allowing utility area operators to communicate with the universal interconnect device, e.g., to deliver updates on the status of the utility grid. Therefore, the universal interconnect device is capable of improving communications between the utility operator and mini-grids with different communication protocols and physical connections.

The universal interconnect device and methods and systems of the subject invention provide benefits for both the DG user and the utility operator. For the DG user, a mini-grid connected to the utility grid by the universal interconnect device of the subject invention can provide voltage and frequency control independent of the utility grid, and load following capabilities. As a result, the DG user can be isolated from utility service disturbances. The subject invention also enables both an islanded black start and a pre-engineered utility service interconnection, thus eliminating interconnection problems that have plagued conventional mini-grid systems.

For the utility operator, the mini-grid including DG sources appears more like a simple load or power source. The universal interconnect device can filter cyclic and transient loads and mitigate load fluctuations. Also, the universal interconnect device can provide reliable islanding capabilities, and there is reduced or eliminated need to provide stability to the DG sources, while allowing the DG sources to serve as a contingency asset to the utility.

Although a preferred embodiment of the invention has been described using specific terms, such description is for illustrative purposes only, and it is to be understood that changes and variations may be made without departing from the spirit or scope of the following claims.

INCORPORATION BY REFERENCE

All patents, published patent applications, and other references disclosed herein are hereby expressly incorporated by reference in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

What is claimed is:

1. A method for operating a mini-grid including one or more power generation sources and one or more loads connected to a bus, comprising the steps of:
   monitoring a condition of a utility grid;
   disconnecting the mini-grid from the utility grid to operate the mini-grid independently in response to a power disruption over the utility grid;
   monitoring at least one of a frequency and a voltage of power on the bus; and
   providing an interconnect device connected to the bus, the interconnect device including at least one of: an energy storage device for absorbing or releasing real power to control the frequency of the power on the bus, and a power quality compensator for absorbing or releasing reactive power to control the voltage of the power on the bus.

2. The method of claim 1, and further including the step of connecting the mini-grid to the utility grid upon receiving a signal from the utility grid.

3. The method of claim 1, and further including the step of connecting the mini-grid to the utility grid upon sensing a normal operating state of the utility grid.

4. The method of claim 1, wherein the step of monitoring the condition of the utility grid includes receiving a signal from the utility grid.

5. The method of claim 1, wherein the step of monitoring the condition of the utility grid includes sensing an operating state of the utility grid.

6. The method of claim 1, wherein after the disconnecting step, the mini-grid is operated independently of the utility grid.

7. The method of claim 6, wherein during independent operation of the mini-grid, at least one DG source is operated to supply power to at least one load connected to the mini-grid.

8. The method of claim 1, wherein the energy storage device includes at least one flywheel energy storage system.

9. The method of claim 1, wherein the interconnect device includes at least the energy storage device, the power quality compensator, and a communication/control module for monitoring at least one of the frequency and the voltage of the bus.

10. A method for operating a mini-grid independently of a utility grid, comprising the steps of:
    providing the mini-grid including one or more power generation sources and one or more loads connected to a bus;
    monitoring at least one of a frequency and a voltage of power on the bus; and
    providing an interconnect device connected to the bus, the interconnect device including at least one of: an energy storage device for absorbing or releasing real power to control the frequency of the power on the bus, and a power quality compensator for absorbing or releasing reactive power to control the voltage of the power on the bus.

11. The method of claim 10, wherein the step of operating the interconnect device is carried out by adding or removing one of the power generation sources.

12. The method of claim 10, wherein the interconnect device is operated by adding or removing one of the loads.

13. A system for operating a mini-grid including one or more power generation sources and one or more loads connected to a bus, comprising:
    a switch for connecting the mini-grid to a utility grid; and
    a universal interconnect device provided between the switch and the bus, the universal interconnect device configured to monitor a condition of the utility grid and disconnect the mini-grid from the utility grid in response to a power disruption over the utility grid;

the universal interconnect device further including a controller for monitoring at least one of a frequency and a voltage of power on the bus, the controller operable to activate at least one of an energy storage device and a power quality compensator to control the frequency or voltage of the power on the bus.

14. The system of claim 13, wherein by disconnecting the mini-grid from the utility grid, the utility grid operates independently from the utility grid.

15. The system of claim 14, wherein during independent operation of the mini-grid, at least one DG source is operated to supply power to at least one load connected to the mini-grid.

16. The system of claim 14, wherein the controller activates the energy storage device to generate or absorb real power from the bus to control the frequency.

17. The system of claim 14, wherein the controller activates the power quality compensator to generate or absorb reactive power from the bus to control the voltage.

18. The system of claim 13, wherein the energy storage device includes at least one flywheel energy storage system.

19. The system of claim 13, wherein the power quality compensator is an AC/DC inverter.

20. The system of claim 13, wherein the bus is a three-phase AC bus.

21. A universal interconnect device for forming a connection between a utility grid and a mini-grid having one or more power generation sources and one or more loads connected to a bus, comprising:

a device for connecting the universal interconnect device to the bus;

a controller configured to monitor a condition of the utility grid and disconnect the mini-grid from the utility grid in response to a power disruption over the utility grid, such that after disconnection the mini-grid operates independently from the utility grid, where the controller monitors at least one of a frequency and a voltage of power on the bus; and an energy storage device for absorbing or releasing real power to control the frequency of the power on the bus.

22. The universal interconnect device of claim 21, and further including a power quality compensator for absorbing or releasing reactive power to control the voltage of the power on the bus.

* * * * *